3,012,994
POLYAMIDES DERIVED FROM CYCLO-
HEXANEBIS(METHYLAMINE)
Alan Bell, James G. Smith, and Charles J. Kibler, Kingsport, Tenn., assignors to Eastman Kodak Company, Rochester, N.Y., a corporation of New Jersey
No Drawing. Filed Oct. 24, 1956, Ser. No. 617,931
26 Claims. (Cl. 260—78)

This invention relates to linear highly polymeric polyamides which can be formed by the condensation of 1,3- or 1,4-cyclohexanebis(methylamine) with one or more bifunctional polyamide-forming compounds. More particularly, this invention relates to those polyamides wherein the polyamide-forming compound is a bifunctional carboxy compound containing from 1 to 20 carbon atoms. Advantageously, the bifunctional carboxy compounds include straight-chain aliphatic dicarboxylic acids containing from 6 to 12 carbon atoms, isomers of such compounds which contain one or two methyl or ethyl radicals attached to the principal carbon chain, the various isomers of cyclohexanedicarboxylic acid, the various isomers of benzenedicarboxylic acid and other aromatic and cycloaliphatic dicarboxylic acids. The especially advantageous polyamides of this invention can be melt-extruded without substantial decomposition at temperatures above 250° C. and in some instances even as high as 350° C. or higher. Moreover, the polyamides have other excellent physical and chemical characteristics such as resistance to acidic or basic hydrolysis, low degree of shrinkage in boiling water and hot air, excellent tensile modulus, etc. These polyamides can be advantageously employed in the manufacture of fibers, yarns, fabrics, film, extruded objects, supports for photographic emulsions, molding compositions, coating compositions, electrical-insulation, etc.

The well-known polyamide which has enjoyed commercial success for a good number of years because of its excellent properties is commonly referred to as nylon 66 and is derived from the condensation of adipic acid and hexamethylenediamine. A closely related polyamide which has been commercially produced is referred to as 6-nylon which is derived from the self-condensation of epsilon-caprolactam. The development of nylon 66 and related polyamides is based upon work done by Carothers and those who have followed him. Although the patents which have been issued disclose numerous alternative diamines to hexamethylenediamine in the preparation of polyamides, none have found commercial acceptance to any significant degree. In Carothers' work there is disclosed the employment of diamines such as para-xylenediamine. The polyamide produced from this particular diamine melts at about 268° C. which is approximately the same melting point possessed by nylon 66 which melts at about 264° C. Polyamides derived by condensing cyclohexane-1,4-diamine have been described in the patented art as being useful in the preparation of certain polyamides which are not considered to be in the same class of general excellence as nylon 66 insofar as concerns an overall combination of properties.

From this background of prior art pertaining to this general field of polyamides, there was nothing which would suggest that 1,4-cyclohexanebis(methylamine) could be employed to produce a polyamide which would represent an outstanding improvement over those properties possessed by nylon 66. The discovery that 1,4-cyclohexanebis(methylamine) can be condensed with adipic acid and other dicarboxy compounds to produce polyamides of general textile utility melting at 250° to 350° C. was indeed most unexpected. Even more unexpected was the discovery that it was possible to melt-extrude by the usual melt-spinning technique a fiber from a polyamide derived from 1,4-cyclohexanebis(methylamine) and an acid such as adipic acid at from about 335 to about 350° C. without significant thermal decomposition. Thus, the thermal properties of the polyamides of this invention are most outstanding.

The polyamide of 1,4-cyclohexanebis(methylamine) derived from essentially trans material condensed with adipic acid has a crystalline melting point of 335–340° C. which is exceptionally high to a quite surprising degree in view of the fact that it is formed from a diamine which contains 8 carbon atoms. In contrast, nylon 86 formed by the condensation of octamethylenediamine and adipic acid melts at only 235° C. and even nylon 66 melts at only 264° C. This further emphasizes the unexpectedly high melting point which was an unexpected characteristic of the polyamides of the present invention.

Although the prior art has disclosed many polyamides which melt at temperatures approximately equivalent to the melting point of nylon 66, many of those which might appear useful have been found to undergo serious decomposition at the temperatures required for melt-spinning the polyamide. Thus, the fibers produced contained decomposition products including bubbles which rendered the fibers useless for practical purposes.

The polyamide of para-xylene-$\alpha,\alpha'$-diamine and sebacic acid melts at about 268° C. whereas the polyamide of the present invention derived from 1,4-cyclohexanebis(methylamine) employing essentially trans material condensed with sebacic acid melts at about 300° C. This in itself is most unexpected since the elimination of the unsaturation in the benzene ring of the known polyamide would ordinarily be assumed to adversely affect the melting point (see "Fibers for Synthetic Polymers," by Rowland Hill published in 1953 by the Elsevier Publishing Company, especially page 317). Thus, by eliminating the unsaturation of the benzene ring, the melting point of the resulting polyamides is raised by an increment of about 30° C. which is quite unexpected since it is the benzene ring which is usually assumed to raise the melting point of polymers.

In addition to the surprisingly high thermal stability of the polyamides derived from 1,3- and 1,4-cyclohexanebis(methylamine), these polyamides were also found to possess numerous other unexpectedly superior properties when compared to nylon 66.

It is an object of this invention to provide highly polymeric linear polyamides derived from the condensation of 1,3- and/or 1,4-cyclohexanebis(methylamine) with a bifunctional compound capable of forming a polyamide.

It is a further object of this invention to provide polyamides wherein a substantial proportion of the recurring structural units are derived from the condensation of 1,3- and/or 1,4-cyclohexanebis(methylamine) and one or more bifunctional dicarboxy compounds including aliphatic saturated acids containing from 6 to 12 carbon atoms and aromatic and hydrogenated aromatic acids containing 6 to 20 carbon atoms.

It is an additional object of this invention to provide linear highly polymeric fiber-forming polyamides which are characterized by improved resistance to decomposition at a melting point of from about 250° C. to about 350° C.

A still further object of this invention is to provide fibers and the films of such polyamides having melting points of at least 250° C. and which can be employed in the manufacture of fabrics, photographic film supports, and for other purposes where exceptionally high physical and chemical characteristics are desirable.

Another object of this invention is to provide a new class of polyamides derived from isomers of 1,3- and 1,4-cyclohexanebis(methylamine) condensed with one or more polyamide-forming compounds, which polyamides can be employed in the preparation of molding compositions, extruding compositions, extruded objects, molded objects, coating compositions, wrapping materials, bristles, fibers, films, sheets, and numerous other compositions and articles of manufacture.

Other objects will become apparent hereinafter.

According to a preferred embodiment of this invention, there is provided a linear highly polymeric polyamide which can be melt-extruded without substantial decomposition at above 250° C. which is composed of a substantial proportion of recurring structural units having at least one of the formulas selected from the group including but not limited to the following which are preferred:

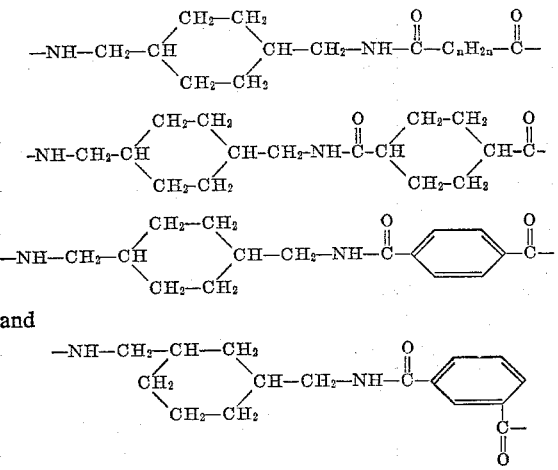

and wherein the respective alicyclic rings can be cis or trans isomers, and $n$ represents a positive integer of from 4 to 10. Of course, $n$ can also represent a larger or a smaller number although the specified range is that most preferred. Moreover, a substantial proportion of these recurring units can be derived from rings connected in the 1,3-positions on the aromatic or alicyclic nuclei.

The polyamide wherein $n$ represents 4, i.e. the homopolymer from adipic acid, can be melt-extruded without substantial decomposition at about 335–350° C. The polyamide wherein $n$ represents 8 can be melt-extruded without substantial decomposition at about 295–325° C. The polyamide formed by a copolymerization process whereby it contains recurring structural units having the above formula wherein $n$ is 4 in some of the recurring structural units and is 8 in the other recurring structural units can be melt-extruded without substantial decomposition in the range from about 260° to about 350° C. depending upon the proportions of the various recurring units.

The especially advantageous linear highly polymeric polyamides composed of recurring units having the formulas given above can be melt-spun in the manner commonly employed for the formation of fibers from polyamides such as nylon 66, thus fibers are melt-spun through a spinneret, drafted and heat-set in the customary manner known in the art, thereby forming oriented fibers characterized by excellent physical and chemical characteristics which generally include the following, depending upon the particular polyamide:

(1) A tenacity of about 4 to 6 grams per denier (nylon 66 is about 5.6).
(2) A hot-bar sticking temperature of about 220° to 300° C. (nylon 66 is about 220°).
(3) Elongation of about 20–30 percent before breaking (nylon 66 is about 17%).
(4) Initial tensile modulus of elasticity of up to about 60 grams/100 denier (nylon 66 is about 30 to not much more than about 40 grams/100 denier).
(5) Retention of about 90 percent or more of original tenacity after soaking for 200 hours at 50° C. in an aqueous solution of 5 percent of either hydrochloric acid or sulfuric acid (nylon 66 is about 37–43%).
(6) Boiling water shrinkage of about 1 percent after 5 minutes (nylon 66 is about 8.5).
(7) Shrinkage in air at 150–175° C. of about 2 percent (nylon 66 is about 7 to 8.5%).

A particularly notable property of these polyamides is their extremely high stability to acid hydrolysis, to which the usual nylons such as 6-nylon and nylon 66 are particularly susceptible. The following table summarizes the comparison of nylon 66 with the polyamide of this invention derived from 1,4-cyclohexanebis(methylamine) employing essentially trans material condensed with sebacic acid. This table shows the effect of hydrolysis in aqueous solutions of acids and bases at 50° C. in terms of the percent of original tenacity which fibers of the polyamide possess after the elapse of the stated period of time.

| Aqueous Acidic or Basic Solution | Time of Immersion (hours) | Percent Retention of Tenacity of Fibers Immersed in Aqueous Acid or Base Indicated at 50° C. | |
|---|---|---|---|
| | | Nylon 66-Hexamethylene diamine and Adipic Acid | Polyamide from 1,4-cyclohexanebis (methylamine) and Sebacic Acid |
| 5% H₂SO₄ | 0 | 100 | 100 |
| | 27 | 78 | 91 |
| | 54 | 75 | 95 |
| | 120 | 69 | 94 |
| | 202 | 43 | 97 |
| 5% HCl | 0 | 100 | 100 |
| | 27 | 80 | 103 |
| | 54 | 75 | 104 |
| | 120 | 40 | 92 |
| | 202 | 37 | 99 |
| 33% NaOH | 0 | 100 | 100 |
| | 27 | 96 | 99 |
| | 54 | 96 | 98 |
| | 120 | 89 | 95 |
| | 202 | 94 | 97 |
| | 370 | 94 | 99 |

The properties of the preferred polyamides of this invention have excellent hydrolytic stability and other desirable characteristics thereby making possible the use of these polyamides in manufacturing fabrics for clothing for chemical workers and fabrics for use in areas where acidic vapors are present. Heretofore the use of polyamide fabrics was not feasible for such purposes. The particular polyamide of this invention whose hydrolytic stability is shown above, when spun into a yarn, had a tenacity of 4.3–5.0 grams per denier at an elongation of 20 to 23%. This particular polyamide had a sticking temperature of 225–230° C. determined by the hot-bar method.

A mono-filament derived from essentially the trans isomer of 1,4-cyclohexanebis(methylamine) and adipic acid was extruded in a Watson-Stillman 1-ounce machine at 660° F. (block temperature of 320° C.) and was drafted at 250–280° C. (hot bar) to a tough fiber with the following properties:

(1) Tensile strength of 25,700 p.s.i. at the yield point and 28,600 p.s.i. at the break point.

(2) Elongation of 28.3 percent, and
(3) Modulus of $8.3 \times 10^5$ p.s.i.

These tensile properties coupled with a high sticking temperature and high melting point which are characteristic of the preferred polyamides of this invention are especially desirable characteristics for yarns employed in the manufacture of fabrics which are to be subjected to extremely rigorous conditions such as in the manufacture of parachutes for high-speed aircraft. The high modulus and high melting point are also desirable in tire cord construction. Moreover, these polyamides, because of their excellent hydrolytic stability and other physical characteristics, are admirably suited for use as film supports for photographic emulsions of either the black-and-white or color type.

For most textile uses, desirable fiber properties include high strength, low shrinkage and a softening point which is sufficiently high to permit ironing without difficulty. Nylon 66 is considered as the acceptable standard since nothing better has been produced which has an overall combination of suitable properties. Many of the polyamides of this invention represent a quite significant improvement.

For use as a tire cord, a fiber must have generally excellent qualities and also possess a high resistance to deformation at temperatures under which it will be used and must retain a high degree of its strength until temperatures of at least about 200° C. are reached. One of the important measures of deformation properties is the tensile modulus or slope of the stress-stain curve for the fiber. This characteristic is measured by plotting tensile stress on one axis as a function of elongation on another axis. Since the curve departs more and more from a straight line as the elongation is increased, the initial tensile modulus of elasticity (which is the slope of the fairly straight early portion of the curve) is employed. It is customary to express this initial modulus in terms of stress in grams per 100 denier at 1% elongation; thus, the value in grams per denier is multiplied by 100 to obtain a convenient number for comparative purposes. Using this as the basis for measurement, the initial modulus should be as high as that developed in certain methods of processing polyamide fibers now commercially available which have an initial tensile modulus of about 40 to 50 grams/100 denier. These are specially prepared yarns of nylon 66 which have high tenacity, low elongation at break and do not lose 50 percent of their strength until a temperature well over 200° C. is reached.

In contrast, the polyamide derived from 1,4-cyclohexanebis(methylamine) condensed with adipic acid in accordance with the present invention has a tensile modulus of about 60 which can be compared with not much more than about 40 for the best known special yarns of nylon 66 and a tensile modulus of about 30 for the ordinary yarns of nylon 66 not specifically designed for employment as tire cord fibers or yarns.

This invention also pertains to polyamides derived from additional bifunctional carboxy compounds containing from 1 to 40 or more carbon atoms. Thus, according to a further embodiment of this invention, polyamides having excellent properties can be prepared by condensing cis or trans 1,3- or 1,4-cyclohexanebis(methylamine) with at least one bifunctional carboxy compound containing from 1 to 40 carbon atoms whereby a linear highly polymeric polyamide comprising recurring structural units having the following formula is obtained:

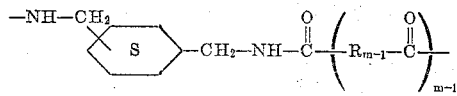

wherein the cyclohexane ring is connected in the recurring structural units in meta or para positions, $m$ is a positive integer of from 1 to 2 and R represents the decarboxylated residue of a bifunctional dicarboxy compound containing from 2 to 40 carbon atoms. Those compositions which are not suitable for textile fibers are useful for molding or coating or for other purposes and are characterized in particular by improved stability in aqueous acidic solutions and thermal stability.

In accordance with a further embodiment of this invention, there is provided a linear highly polymeric polyamide prepared by condensing either 1,3- or 1,4-cyclohexanebis(methylamine) in conjunction with another bifunctional diamine containing from 2 to 20 carbon atoms. The mixture of diamines employed in forming the polyamides should include at least 10 mole percent of the 1,3- or 1,4-cyclohexanebis(methylamine). Thus, the 1,3- or the 1,4-cyclohexanebis(methylamine) contributes to the hydrolytic and thermal stability, and to many other of the physical and chemical characteristics of any polyamide into which it is incorporated. The 1,4-isomer is preferred. The particular polyamides of this embodiment of the invention can be depicted by considering them as modified polyamides which are highly polymeric linear polyamides comprising recurring structural units containing at least 10 mole percent of those structural units having the following formula:

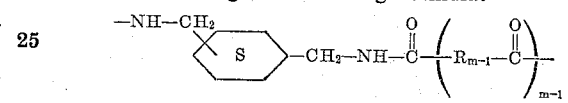

which formula has been described above and includes cis and trans isomers of the alicyclic ring, and up to 90 percent of recurring structural units having the following formula:

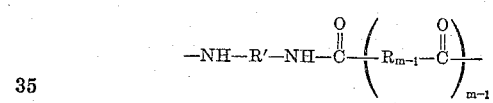

wherein R and $m$ have been defined above and R′ represents the deaminated residue of a bifuncitonal diamino compound containing from 1 to 20 carbon atoms.

In addition to the polyamides prepared from diamines and the bifunctional carboxylic acids which are contemplated by this invention, it is also obvious that other modifications come within the scope of the invention such as that modification obtained by incorporating into the reaction mixture during the preparation of the polyamide one or more of the amino carboxylic acids or one or more of the lactams of such amino carboxylic acids. These additional modifiers can be compounds containing from 6 to 20 carbon atoms and include the aliphatic, alicyclic, aromatic and other organic compounds of these types such as aminopivalic acid, aminobutyric acid, aminocaproic acid, aminobenzoic acid, 4-aminocyclohexanecarboxylic acid, aminomethylcyclohexanecarboxylic acid, epsilon, caprolactam, etc.

According to another particular embodiment of this invention there is provided a linear highly polymeric polyamide comprising recurring structural units having the following formula:

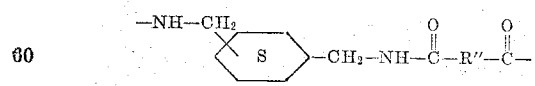

wherein the cis or trans isomer of the cyclohexane ring is connected in the recurring structural units in positions selected from the group consisting of meta and para positions, and R″ represents the residue of a bifunctional hexacarbocyclic dicarboxy compound containing from 8 to 20 carbon atoms wherein the carboxy radicals are located in nuclear positions selected from the group consisting of those in a para relationship and those in a meta relationship.

The high melting points of some of the polyamides covered by this invention have been emphasized in the above discussion and the following table is presented in order to illustrate the melting point of various polyamides; in this table the expression CBM represents essentially the trans isomer of 1,4-cyclohexanebis(methylamine) unless the contrary is indicated:

| Co-ingredients | Melting Point of the polyamide in degrees C. |
|---|---|
| 1. Adipic acid+CBM | 335-340 |
| 2. Adipic acid+30 mole percent cis isomer of CBM and 70 mole percent CBM (trans) | 295-303 |
| 3. Adipic acid+50 mole percent cis isomer of CBM and 50 mole percent CBM (trans) | 265-273 |
| 4. Adipic acid+75 mole percent cis isomer of CBM and 25 mole percent CBM (trans) | 185-192 |
| 5. Adipic acid+50 mole percent of CBM and 50 mole percent 1,6-hexamethylenediamine | 270-275 |
| 6.* Adipic acid+40 mole percent CBM and 60 mole percent m-xylene-α,α'-diamine | 270 |
| 7.* Adipic acid+30 mole percent CBM and 70 mole percent m-xylene-α,α'-diamine | 250 |
| 8. 60 mole percent adipic acid and 40 mole percent α-ethylsuberic acid+CBM | 260-270 |
| 9. 60 mole percent adipic acid and 40 mole percent of α,α'-diethyladipic acid+CBM | 260-270 |
| 10.* A mixture of 50 to 60 mole percent of adipic acid and a dimerized fatty acid sold by Emery Industries which contains approximately 36 carbon atoms (40-50 mole percent)+CBM | 260-290 |
| 11. Adipic acid+cis isomer of CBM | 237-242 |
| 12. Pimelic acid+CBM | 275-287 |
| 13. Suberic acid+CBM | 310-315 |
| 14. Azelaic acid+CBM | 274-285 |
| 15. Sebacic acid+CBM | 290-295 |
| 16. Sebacic acid+25 mole percent cis isomer of CBM and 75 mole percent CBM (trans) | 255-265 |
| 17. 60 mole percent sebacic acid and 40 mole percent adipic acid+CBM | 244-254 |
| 18. Dodecane-1,12-dioic acid+CBM | 250-260 |
| 19. Dimethylmalonic acid+CBM | 250-260 |
| 20. 3-methyladipic acid+CBM | 284-287 |
| 21. "Isosebacic" acid+CBM | 150-190 |
| 22. 80 mole percent "Isosebacic" acid and 20 mole percent trans-1,4-cyclohexanedicarboxylic acid+CBM | 260-270 |
| 23. Isophthalic acid+CBM | 280-290 |
| 24. 80 mole percent isophthalic acid and 20 mole percent terephthalic acid+CBM | 255-270 |
| 25. 80 mole percent isophthalic acid and 20 mole percent adipic acid+CBM | 250-274 |
| 26.* Trans 1,4-cyclohexanedicarboxylic acid+20 mole percent CBM and 80 mole percent of the diether diamine having the following formula: H₂N(CH₂)₃O-CH₂C(CH₃)₂CH₂-O-(CH₂)₃-NH₂ | 300-310 |
| 27.* 20 mole percent adipic acid, 20 mole percent CBM and 60 mole percent 6-aminohexanoic acid | 245-250 |
| 28.* 10 mole percent of trans-1,4-cyclohexanedicarboxylic acid, 10 mole percent CBM and 80 mole percent of 6-aminohexanoic acid | 260-265 |
| 29.* 24 mole percent sebacic acid, 24 mole percent CBM and 52 mole percent of epsilon-caprolactam | 260-268 |
| 30.* 2,5-Norcamphane dicarboxylic acid+CBM | 255-260 |
| 31. Ethylenedioxydiacetic acid+CBM | 170-175 |
| 32. 1,3-cyclohexanebis(methylamine)+adipic acid | 120-140 |
| 33. 30 mole percent 1,3-cyclohexanebis(methylamine) and 70 mole percent CBM+adipic acid | 305-315 (decomp.) |
| 34. 50 mole percent 1,3-cyclohexanebis(methylamine) and 50 mole percent CBM+adipic acid | 275-282 |
| 35. 1,3-cyclohexanebis(methylamine)+isophthalic acid | 200-220 |
| 36. 1,3-cyclohexanebis(methylamine)+trans-1,4-cyclohexanedicarboxylic acid | 380 (decomp.) |

The asterisks indicate that the polyamides are also covered in copending applications, Serial Nos. 635,957-961 inclusive, filed January 24, 1957, by Caldwell et al., and referred to again hereinbelow.

It is apparent from the above table that many of the polyamides of this invention have unusually high melting points which, when associated with high sticking temperatures, make them particularly desirable in the manufacture of threads for fabrics, photographic film supports, electrical insulation, heat-resistant protective coatings and the like. However, it is also apparent that all of the polyamides contemplated by this invention have improved utility suited for many of these purposes and others as well.

Although the employment of 1,3-cyclohexanebis(methylamine) does not generally produce exceptionally high melting polyamides when condensed as the sole diamine with a straight-chain aliphatic dicarboxylic acid, these polyamides are valuable in the preparation of molding compositions, protective coatings and the like where excellent hydrolytic stability is especially important. The polyamides derived from 1,3-cyclohexanebis(methylamine) condensed with a hexacarbocyclic dicarboxy compound, especially terephthalic acid, hexahydroterephthalic acid (i.e. 1-4-cyclohexanedicarboxylic acid), 4,4'-diphenic acid, 4,4'-benzophenonedicarboxylic acid, 4,4'-sulfonyldibenzoic acid, and isophthalic acid, as well as other similar acids containing from 8 to 20 carbon atoms, produce polyamides of exceptionally high melting points and high sticking temperatures. This fact was most unexpected and quite unobvious in view of the common understanding that a para relationship is essential in securing polyamides having a high melting point. Among the most surprising discoveries was the extremely high melting point obtained when a polyamide was formed by condensing 1,3-cyclohexanebis(methylamine) with trans-1,4-cyclohexanedicarboxylic acid.

In addition to the employment of 1,4-cyclohexanebis(methylamine) or 1,3-cyclohexanebis(methylamine) or mixtures thereof, polyamides can also be prepared wherein a minor portion of either of these diamines is replaced with 1,2-cyclohexanebis(methylamine) and/or 1,1-cyclohexanebis(methylamine).

1,4-cyclohexanebis(methylamine) and the isomers thereof which are employed in accordance with this invention can be prepared by the catalytic reduction of cyclohexane-1,4-dicarbonitrile and isomers thereof. The cyclohexane-1,4-dicarbonitrile may be prepared by passing dimethyl hexahydroterephthalate and ammonia over a suitable catalyst or by other standard procedures. Variations of such procedure can be employed in preparing the 1,3-isomer, the 1,2-isomer and the 1,1-isomer.

The aliphatic dicarboxylic acids which are particularly useful in practicing this invention can be selected from the series of alpha, omega-dicarboxylic acids comprising adipic acid, pimelic acid, suberic acid, azelaic acid, sebacic acid, dodecane-1,12-dioic acid, etc. and known equivalents thereof. Other useful acids of this type which can advantageously be employed include 3-methyladipic acid, glutaric acid, dimethylmalonic acid, brassylic acid, α,α'-diethyladipic acid, 5-methylsebacic acid, and other related acids containing from 1 to 2 methyl or ethyl radicals on the chain of carbon atoms connecting the carboxy radicals. Mixtures of two or more of these acids can also be employed.

Up to 90 percent of the 1,4-cyclohexanebis(methylamine) or 1,3-cyclohexanebis(methylamine) can be replaced with additional amines such as the polymethylenediamines of the formula $H_2N(CH_2)_sNH_2$ where $s$ is a positive integer of from 2 to 12. Other bifunctional diamines which can be employed as modifiers include the 1,2- and 1,1-isomers of cyclohexanebis(methylamine), p-xylene-α,α'-diamine, m-xylene-α,α'-diamine, 1,4-cyclohexanediamine, other isomers of cyclohexanediamine, aliphatic branched-chain diamines, such as 3-methylhexamethylenediamine, 3-methylheptamethylenediamine, 2,4-dimethylhexamethylenediamine, aromatic diamines such as 2,4-toluenediamine, p,p'-diphenyldiamine, 1,4-dimethyl-3,5-diaminobenzene, etc. It is obvious that these additional bifunctional diamines which can be employed are far too numerous to list in this specification, that their nature is well known in the art and that they need not be further elaborated upon herein.

Other embodiments of this invention as described above include those polyamides wherein an additional bifunctional carboxylic acid is present containing from 2 to 40 carbon atoms. Such compounds can be depicted by the formula:

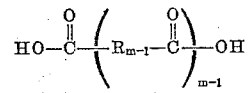

wherein R and $m$ have been defined above, including isosebacic acid, diglycollic acid, carbonic acid, oxalic acid, malonic acid, ethylenedioxydiacetic acid, 2-ethylglutaric acid, 2-ethyl-5-methyladipic acid, and various other straight-chain and branched-chain aliphatic dibasic acids as well as the dibasic acids containing nonfunctional substituents. Quite obviously any of the bifunctional carboxylic acids known in the art to be useful in the preparation of polyamides can be employed in preparing modifications of those polyamides which constitute the preferred embodiments of the invention. When R contains more than about 12 carbon atoms, the resulting recurring structural units will not advantageously compose more than 50% of the polymer.

One of the especially effective modifiers is 2,5-norcamphanedicarboxylic acid, the polyamides of which are described in a copending application, Serial No. 740,203, filed on June 6, 1958, by Caldwell, now U.S. Patent 2,972,602. The 2,5-norcamphanedicarboxylic acid can be prepared from cyclopentadiene and acrylonitrile.

Another of the modifying diamines which can be employed to form modified polyamides is 2,5-norcamphanebis-(methylamine).

A mixture of 1,4 - cyclohexanebis(methylamine) and 1,3-cyclohexanebis(methylamine) may be prepared by the following series of reactions:

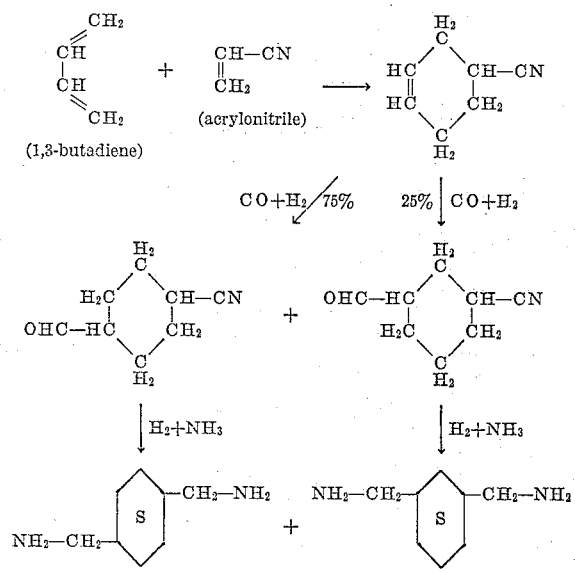

These compounds may also be prepared by a method described by Malachowski et al., Ber. 71, 759–767 (1938).

Of course, in addition to the modifiers already mentioned, other modifiers can be employed in accordance with techniques known in the art for the preparation of polyamides and modified polyamides. These modifiers may, among others, include trifunctional amines and trifunctional carboxylic acids as well as those which contain olefinic unsaturation, for example, maleic acid, citric acid, tartaric acid, maleic anhydride, fumaric acid, etc.

Certain modified polyamides employing 6-aminocaproic acid (or the lactam) are described in applications filed on January 24, 1957 by J. R. Caldwell and R. Gilkey, Serial Numbers 635,957, 58 and 59, now U.S. Patent Nos. 2,985,626, 627 and 628. Other modified polyamides are described in a further application filed on even date herewith by J. R. Caldwell and R. Gilkey, Serial No. 617,903. Another application Serial No. 635,961 filed January 24, 1957 by J. R. Caldwell and R. Gilkey, now U.S. Patent No. 2,939,862 pertains to polyamides employing trans-1,4-cyclohexanedicarboxylic acid condensed with an ether type diamine and may include modifiers such as 1,4-cyclohexanebis(methylamine).

There are many ways in which the polyamides of this invention can be prepared. The techniques employed are known in the art and have been described in numerous patents and in the literature. The working examples presented hereinbelow illustrate several processes for preparing these polyamides.

One common method for preparing polyamides comprises dissolving in an alcohol such as methanol one mole proportion of a diamine which in this case is 1,3- or 1,4-cyclohexanebis(methylamine) and, if necessary, heating this solution which is then mixed with a similar solution of one mole of one or more bifunctional carboxylic acids which have been dissolved in methanol or some lower alcohol or similar solvent. After mixing and cooling, the reaction product separates out as a salt or mixture of salts which can be filtered, washed with an alcohol such as methanol and dried. This salt product can then be mixed with somewhere on the order of an equivalent weight of water and heated in a closed reactor under an inert atmosphere such as nitrogen, helium, or the like. It is generally advantageous to employ a glass-lined autoclave for this purpose and to control the pressures within the autoclave in order to secure the most advantageous results. For example, the mixture of the salt product and water can be heated for about 1 hour at approximately the melting point of the salt under an elevated pressure such as 250 p.s.i. (pounds per square inch), following which the heating is continued at the same pressure for about another hour at an increased temperature and then for about an additional hour under an inert atmosphere at atmospheric pressure. Of course, many variations of this technique are feasible and are well known in the art. Thus, the salt product may be subjected to polymerization by heating it in a solvent such as a mixture of para- and meta-cresol, or simply by heating it under a nitrogen atmosphere at atmospheric pressure, or by heating it under a vacuum. Many other variations in the preparation of polyamides are equally well known. For example, the salt product from the carboxylic acid and diamine need not necessarily be isolated. It can be prepared by mixing the reagents and, without a separate isolation step, the salt product can then be heated so as to form the polyamide. Many of these variations are set forth in the working examples presented hereinbelow. Of course, continuous processes can also be devised based upon the principles affecting the preparation of nylon 66, 6-nylon and other polyamides presently under commercial production.

In the examples given herein the inherent viscosities were measured in a solvent made up of 60% phenol and 40% tetrachloroethane, by weight, using the standard methods and calculations. The initial tensile moduli were determined on the basis described hereinabove. The 1,4-cyclohexanebis(methylamine) employed was essentially the trans material unless otherwise indicated.

This invention can be further illustrated by the following examples of preferred embodiments although it will be understood that these examples are included merely for purposes of illustration and are not intended to limit the scope of the invention unless otherwise specifically indicated:

*Example 1*

Fourteen and two-tenths grams (0.1 mole) of 1,4-cyclohexanebis(methylamine) were dissolved in 25 ml. of methanol. This solution was added to a hot solution of 14.6 g. (0.1 mole) of adipic acid in 50 ml. of methanol. After mixing and cooling the salt was filtered, washed with methanol, and dried. It weighed 28.5 g., melting point 218–221° C. with decomposition. This salt was mixed with 25 ml. of water in a glass tube liner designed for a stationary autoclave. The tube was placed in a nitrogen-swept autoclave and treated as follows: one hour at 220° C. and 250 p.s.i., one hour at 275° C. and 250 p.s.i., and one hour at 275° C. under nitrogen at atmospheric pressure (0 p.s.i.). A white opaque solid was obtained with an inherent viscosity (determined in 60–40 phenoltetrachloroethane solvent) of 0.93. The melting point of the polyamide was 335–340° C. The polyamide could be further polymerized by heating at 270° C. and 0.05 mm. pressure for 3 hours to give an inherent viscosity of 1.17.

Example 2

Fourteen and two-tenths grams (0.1 mole) of 1,4-cyclohexanebis(methylamine) was dissolved in 25 ml. of methanol. The solution was added to a hot solution of 20.2 g. (0.1 mole) of sebacic acid in 25 ml. methanol. The salt which precipitated on cooling was filtered, washed, and dried under vacuum. This salt amounted to 28.6 g. and melted at 209–212° C. The salt was treated with 25 ml. of water and the mixture heated in a sealed autoclave under conditions similar to those described in Example 1. A white opaque polyamide resulted with an inherent viscosity of 1.09 and melting point of 294–297° C. This spun to give fibers of high tenacity and good dyeability.

Example 3

Twenty-eight grams of salt as prepared in Example 2 from 1,4-cyclohexanebis(methylamine) and sebacic acid was treated with 25 ml. of water and 10 g. of caprolactam and the mixture heated in a sealed autoclave under conditions similar to those described in Example 1. A white opaque polyamide resulted which had an inherent viscosity of 0.82 and a melting point of 260–268° C.

Example 4

Fourteen and two-tenths grams (0.1 mole) of 1,4-cyclohexanebis(methylamine) in 25 ml. of methanol were added to a hot solution of 7.3 g. (0.05 mole) of adipic acid and 10.1 g. (0.05 mole) of sebacic acid in 25 ml. of methanol. On cooling, the precipitate was filtered off, washed with methanol, and dried under vacuum. The salt amounted to 23.5 g. and melted at 207–210° C. This salt was mixed with 25 ml. of water and heated in a sealed autoclave under the conditions described in Example 1. A white opaque polyamide resulted which melted at 279–283° C. and had an inherent viscosity of 1.01.

Example 5

Five and eight-tenths grams (0.05 mole) of hexamethylenediamine and 7.1 g. (0.05 mole) of 1,4-cyclohexanebis(methylamine) were dissolved in 25 ml. of methanol. The solution was added to a hot solution of 14.6 g. (0.1 mole) of adipic acid in 25 ml. of methanol. The salt which separated amounted to 11.8 g. and melted at 200–203° C. Heating this salt with 10 ml. of water in a sealed autoclave under the conditions described in Example 1 produced a white opaque polyamide with an inherent viscosity of 0.95 and a melting point of 270–275° C.

The procedures described in these five examples were employed to prepare numerous polyamides whose melting points are given in the table presented hereinabove. All of these polyamides melting above about 240° C. were excellently suited for preparing fibers of superior properties particularly excelling in sticking temperature, tensile modulus, hydrolytic stability in aqueous acids, and thermal stability. The preparation of some of these and some related polyamides are further set forth in the following additional examples.

Example 6

The cis-1,4-cyclohexanebis(methylamine) (2.84 g., 0.02 mole) was added to a mixture of 2.92 g. (0.02 mole) of adipic acid in 7 ml. of cresol. The mixture was stirred and heated at 180–220° C. until water no longer distilled. The temperature of the clear solution was raised over an hour to 270–280° C., and the pressure was reduced to less than 1 mm. of mercury. After ten minutes under vacuum, the melt was cooled. The polyamide had an inherent viscosity of 1.07 and a melting point of 237–242° C.

Example 7

The 1,4-cyclohexanebis(methylamine) (2.74 g., 0.0193 mole) was added to a suspension of 3.90 g. (0.0193 mole) of "Isosebacic" acid in 10 ml. of cresol. The mixture was heated at 180–205° C. until the evolution of water ceased (1–2 hours). A clear light yellow mobile solution resulted. The temperature was raised over a one-hour period to 270–280° C. and the pressure reduced to less than 1 mm. of mercury. After ten minutes under vacuum, the viscous melt was cooled. A polyamide with a viscosity of 0.56 and a melting point of 150–190° resulted. "Isosebacic" acid is a mixture of isomers of branched chain acids related to sebacic acid.

Example 8

Isophthalic acid (3.32 g., 0.02 mole) was suspended in 20 ml. of ethanol and 2.98 g. (0.021 mole) of 1,4-cyclohexanebis(methylamine) in 10 ml. of ethanol was added with stirring. The mixture was stirred for fifteen minutes and 35 ml. of water was added. The precipitate largely dissolved and solution was completed by warming the mixture. The solution was poured into 100 ml. of ethanol to precipitate the salt. This salt amounted to 6.3 g. and melted at 263–267° C. The salt was added to 10 ml. of cresol and the mixture treated as described in Example 7. A polyamide of viscosity 0.40 and melting point 280–290° C. was produced. This product could be further polymerized by heating the powdered polymer under vacuum at 260° C. for three hours; the product had a viscosity of 1.23.

Example 9

A mixture of 0.86 g. (0.0059 mole) of adipic acid, 3.92 g. (0.0236 mole) of isophthalic acid, 4.18 g. (0.0295 mole of 1,4-cyclohexanebis(methylamine) and 10 ml. of cresol was heated as described in Example 7. The polyamide had a viscosity of 0.91 and a melting point of 250–274° C.

Example 10

A polyamide was prepared in a manner identical with that used in Example 9 but using 0.99 g. (.00596 mole) of terephthalic acid instead of adipic acid. The polyamide has a viscosity of 0.89 and a melting point of 255–270° C.

Example 11

A mixture of 4.20 g. (0.0288 mole) of adipic acid, 0.64 g. (0.0032 mole) of sebacic acid, 4.54 g. (0.0320 mole) of 1,4-cyclohexanebis(methylamine) and 7 ml. of cresol was treated in the manner described in Example 7.

The polyamide melted at 307–315° C. and had a viscosity of 0.69. This and further examples of copolyamides incorporating various ratios of adipic and sebacic acids are summarized in the following table:

| Example | Moles of Acid | | Mole Percent Sebacic Acid | Viscosity | M. P., ° C. |
|---|---|---|---|---|---|
| | Sebacic | Adipic | | | |
| See Ex. 1 | 0 | 100% | 0 | 0.93 | 335–40 |
| 11 | .0032 | .0288 | 10 | 0.69 | 307–15 |
| 12 | .00654 | .0262 | 20 | 0.68 | 292–304 |
| 13 | .0095 | .0222 | 30 | 0.49 | 288–297 |
| 14 | .015 | .015 | 50 | 0.84 | 256–66 |
| 15 | .012 | .008 | 60 | 0.80 | 244–54 |
| 16 | .020 | .006 | 70 | 0.69 | 254–62 |
| 17 | .025 | .0025 | 90 | 0.84 | 266–74 |
| See Ex. 2 | 100% | 0 | 100 | 1.09 | 294–97 |

Example 18

A mixture of 4.85 g. (0.0332 mole) of adipic acid, 4.72 g. (0.0332 mole) of 1,3-cyclohexanebis(methylamine) and 10 ml. of cresol were heated in the manner described in Example 7. The product was a polyamide of viscosity 0.70 and melting point 110-140° C.

Example 19

Example 18 was repeated using 5.54 g. (0.0332 mole) of isophthalic acid. The polyamide had a viscosity of 0.89 and a melting point of 220–235° C.

Example 20

A solution of 3.90 g. (0.0193 mole) of sebacic acid in 10 ml. of hot ethanol was treated with 2.74 g. (0.0193 mole) of 1,4-cyclohexanebis(methylamine) in 5 ml. of ethanol. The salt precipitated rapidly. The mixture of this salt and ethanol was then stirred under an inert atmosphere and heated at 100–130° C. until the ethanol had distilled. The temperature of the reaction was then raised over a one-hour period to 310–320° C. After the salt had completely melted, a vacuum of less than 1 mm. of mercury was applied and maintained for ten minutes. A colorless polyamide of viscosity 0.74 was produced.

Example 21

The salt from sebacic acid and 1,4-cyclohexanebis(methylamine) was prepared and isolated as described in Example 2. Fifty grams of the salt were mixed with 10 ml. of water and the mixture heated and stirred at 100–130° C. until the water had distilled completely. The temperature was raised over an hour to 310–320° C. Melting of the residue began above 280° C. When the material was completely molten, the melt was placed under vacuum (1 mm.) for ten minutes. The polyamide was colorless, melted at 290–295° C. and had a viscosity of 0.71. It could be further polymerized by heating the powdered solid at 260° C. for 3 hours at 0.1 mm. pressure. The final viscosity was 1.02.

Example 22

A procedure identical with that of Example 21 was used except that the molten polyamide was held at 310° C. and 0.5 mm. pressure for one hour. The viscosity of the final polymer was 0.90.

Example 23

A procedure identical with that of Example 21 was used except that the molten polyamide was held at 310° C. under nitrogen at atmospheric pressure for fifteen minutes. A viscosity of 0.70 was produced.

Example 24

A polyamide was made by the procedures described herein from 1 mole adipic acid, 0.6 mole m-xylene-$\alpha,\alpha'$-diamine and 0.4 mole of 1,4-cyclohexanebis(methylamine). This polyamide melted at 255°–270° C. It was melt-spun to form excellent fibers. It was formed into film and various molded objects which were characterized by transparency and noteworthy physical and chemical characteristics as described hereinabove. The tensile modulus of the fibers was 60–63 which is much higher than ordinary nylon 66 having a tensile modulus of about 25–32. Hence this fiber is admirably suited for automobile tire cord (cotton which is used for tire cord has a tensile modulus of 57–60 and is the best in this regard of any fiber now known to be in current use for tire manufacture). This polyamide melts at about 30° C. higher than the corresponding polyamide where the only amine is m-xylene-$\alpha,\alpha'$-diamine, this is contrary to Flory's rule, J. Am. Chem. Soc. 72, 2024 (1950). This particular copolyamide is further described by J. R. Caldwell and R. Gilkey and is claimed in their application filed concurrently herewith, Serial No. 617,903.

The polyamide from dodecane-1,12-dioic acid and 1,4-cyclohexanebis(methylamine) was formed into oriented fibers having a hot bar sticking temperature of 230°–235° C., tenacity of 4.5 gm./denier, tensile modulus of 35, excellent dyeability, and other properties useful in fibers and molded articles such as excellent impact strength. The polyamide from isophthalic acid described above formed excellent fibers; and molded articles were especially characterized by low moisture absorption and remarkably constant physical properties over a wide range of humidity and temperature variations whereby it is especially valuable as an electrical insulator. Other polyamides produced as in the examples have properties as discussed throughout this specification.

Example 25

A mixture of 2.13 g. (0.015 mole) of trans-1,4-cyclohexanebis(methylamine) and 0.71 g. (0.005 mole) of cis-1,4-cyclohexanebis(methylamine) was added to 4.04 g. (0.02 mole) of sebacic acid in 7 ml. of cresol. The mixture was stirred and heated at 180–220° C. After two hours a clear solution remained and no further water evolved. The temperature was raised in one hour to 280–290° C. and the pressure reduced to less than 1 mm. for ten minutes. The resulting viscous melt was cooled under nitrogen. The polyamide had an inherent viscosity of 1.24 and a melting point of 255–265° C.

Example 26

A mixture of 0.85 g. of cis- and 2.00 g. of trans-1,4-cyclohexanebis(methylamine) (total of 0.02 mole of diamine containing 30% cis) was added to 2.92 g. of adipic acid in 7 ml. of cresol. The mixture was treated in a manner similar to that described in Example 6. The final polyamide had an inherent viscosity of 0.96 and a melting point of 295–303° C.

Example 27

A mixture of 1.42 g. of cis- and 1.42 g. of trans-1,4-cyclohexanebis(methylamine) (0.02 mole of mixed diamines containing 50% cis) was used in place of the diamines of Example 26. The procedure used to polymerize these diamines with adipic acid was identical with that described in Example 6. The final polyamide had an inherent viscosity of 1.36 and melted at 265–273° C.

Example 28

When a mixture of 2.13 g. of cis- and 0.71 g. of trans-1,4-cyclohexanebis(methylamine) (0.02 mole of total diamine containing 75% cis) was used in place of the diamines of Example 27, the final polyamide had an inherent viscosity of 0.89 and melted at 185–192° C.

Example 29

A mixture of 2.92 g. (0.02 mole) of adipic acid, 0.85 g. (0.006 mole) of 1,3-cyclohexanebis(methylamine), 2.00 g. (0.014 mole) of 1,4-cyclohexanebis(methylamine) (approximately 95% trans), and 7 ml. of cresol were stirred at 180–210° C. until water no longer distilled. The clear solution was heated in one hour to a temperature of 340° C. and a vacuum of less than 1 mm. of mercury applied. The viscous melt was stirred under vacuum at 340° C. for ten minutes and then cooled. The polyamide had a melting point of 305–315° C. with decomposition and an inherent viscosity of 0.75.

Example 30

A mixture of 2.92 g. (0.02 mole) of adipic acid, 1.42 g. (0.01 mole) of 1,3-cyclohexanebis(methylamine), 1.42 g. (0.01 mole) of 1,4-cyclohexanebis(methylamine) (approximately 95% trans), and 7 ml. of cresol were treated as described in Example 29 except that the final temperature was 300° C. The polyamide had an inherent viscosity of 0.89 and a melting point of 275–282° C.

The broad use of the term 1,4-cyclohexanebis(methylamine) as written in the specification and claims and as shown in the structural formulas includes either isomer alone or a mixture of cis and trans-isomers; however, when not otherwise specified in the specific examples, this term comprehends a material which is essentially trans isomer (about 95–100% trans). The hexagon containing an S inside represents a fully saturated benzene ring which is the same thing as cyclohexane and includes the cis and trans isomers (alone or in combination) of those depicted derivatives thereof. These statements apply similarly to both the 1,3-compounds and the 1,4-compounds.

Although the invention has been described in consider-

We claim:
1. A highly polymeric linear polyamide of (A) at least one bifunctional dibasic organic carboxylic acid component containing from 1 to 40 carbon atoms and (B) a bifunctional organic diamine component, the diamine component of said polyamide consisting essentially of a member selected from the group consisting of the cis and trans isomers of 1,3-cyclohexanebis(methylamine) and 1,4-cyclohexanebis(methylamine).

2. A polyamide as defined by claim 1 wherein said diamine (B) is solely composed of a mixture of the cis and trans isomers of 1,4-cyclohexanebis(methylamine).

3. A polyamide as defined by claim 1 wherein said 1,4-cyclohexanebis(methylamine) is composed of at least about 95% trans isomer, said polyamide being characterized by becoming plastic without undergoing significant decomposition at temperatures between about 240° C. and about 350° C. and is capable of forming fibers characterized by improved thermal stability and hydrolytic stability contributed by the trans isomer of 1,4-cyclohexanebis(methylamine) constituent in said polyamide.

4. A highly polymeric linear polyamide of (A) at least one bifunctional dibasic organic carboxylic acid component containing from 1 to 40 carbon atoms and (B) a bifunctional organic diamine component, the diamine component of said polyamide consisting essentially of a cyclohexanebis(methylamine) selected from the group consisting of the cis and trans isomers of 1,3-cyclohexanebis(methylamine) and 1,4-cyclohexanebis(methylamine), said cyclohexanebis(methylamine) being composed of an amount of the trans isomer equal to at least 95 mole percent of the amount of said carboxylic acid component (A) which is an aliphatic acid, said polyamide being characterized by becoming plastic without undergoing significant decomposition at temperatures between about 240° C. and about 350° C. and being capable of forming fibers charactertized by improved thermal stability and hydrolytic stability contributed by the trans isomers of the cyclohexanebis(methylamine) constituents in said polyamide.

5. A polyamide as defined by claim 4 wherein said carboxylic acid component (A) is adipic acid.

6. A polyamide as defined by claim 4 wherein said carboxylic acid component (A) is sebacic acid.

7. A polyamide as defined by claim 4 wherein said carboxylic acid component (A) is a mixture of adipic acid and sebacic acid.

8. A polyamide as defined by claim 4 wherein said carboxylic acid component (A) is composed of at least 50 mole percent of a carboxylic acid which contains from 8 to 20 carbon atoms, has at least one nucleus selected from the group consisting of a benzene ring and a hydrogenated benzene ring and contains two nuclear carboxy radicals located at two of the meta and para positions on said rings, said polyamide being characterized by becoming plastic without undergoing significant decomposition at temperatures above about 150° C. and below about 350° C.

9. A polyamide as defined by claim 1 wherein said carboxylic acid (A) is composed of at least 50 mole percent of a carboxylic acid which contains from 8 to 20 carbon atoms, has at least one nucleus selected from the group consisting of a benzene ring and a hydrogenated benzene ring and contains two nuclear carboxy radicals located at two of the meta and para positions on said rings, said polyamide being characterized by becoming plastic without undergoing significant decomposition at temperatures above about 150° C. and below about 350° C.

10. A polyamide as defined by claim 9 wherein said diamine (B) is at least about 10 mole percent 1,3-cyclohexanebis(methylamine).

11. A polyamide as defined by claim 10 wherein said carboxylic acid (A) is trans-1,4-cyclohexanedicarboxylic acid.

12. A fiber of the polyamide defined by claim 1.
13. A fiber of the polyamide defined by claim 4.
14. A fiber of the polyamide defined by claim 5.
15. A fiber of the polyamide defined by claim 6.
16. A fiber of the polyamide defined by claim 7.
17. A fiber of the polyamide defined by claim 8.
18. A fiber of the polyamide defined by claim 9.
19. A film of the polyamide defined by claim 1.
20. A film of the polyamide defined by claim 4.
21. A film of the polyamide defined by claim 5.
22. A film of the polyamide defined by claim 6.
23. A film of the polyamide defined by claim 7.
24. A film of the polyamide defined by claim 8.
25. A film of the polyamide defined by claim 9.

26. An oriented heat set fiber of a polyamide defined in claim 15 characterized by (1) a tenacity of at least about 4 g. per denier, (2) a hot bar sticking temperature of at least about 220° C., (3) a tensile strength of at least about 25,000 lbs./sq. in., (4) elongation of at least about 20% before breaking, (5) initial tensile modulus of elasticity of at least about 40 grams per 100 denier, (6) retention of at least about 90% of original tenacity after soaking for 200 hours in an aqueous solution of 5% of either HCl or $H_2SO_4$, (7) boiling water shrinkage of about 1% after 5 minutes, and (8) shrinkage in air at 150°–175° C. of about 2%.

References Cited in the file of this patent

UNITED STATES PATENTS

| | | |
|---|---|---|
| 2,130,523 | Carothers | Sept. 20, 1938 |
| 2,916,476 | Caldwell et al. | Dec. 8, 1959 |

FOREIGN PATENTS

| | | |
|---|---|---|
| 1,112,203 | France | Nov. 9, 1955 |

OTHER REFERENCES

Malachowski et al.: Berichte Deut. Chem. Gesel., vol. 71B, 1938, pp. 759, 763.